United States Patent
Lyddon

[19]

[11] Patent Number: 6,010,294
[45] Date of Patent: Jan. 4, 2000

[54] TRACTOR HYDRAULIC GRABBING TOOL

[76] Inventor: John Lyddon, 735 Endfield Way, Hillsborough, Calif. 94010

[21] Appl. No.: 09/013,744

[22] Filed: Jan. 27, 1998

[51] Int. Cl.⁷ ...................................................... B66L 3/00
[52] U.S. Cl. ............................... 414/23; 414/739; 37/302
[58] Field of Search ..................................... 414/739, 729, 414/741, 920, 23; 37/301, 302, 303, 903; 111/101

[56] References Cited

U.S. PATENT DOCUMENTS

| | | | |
|---|---|---|---|
| 2,535,099 | 12/1950 | Slick | 414/23 |
| 3,140,786 | 7/1964 | Clatterbuck . | |
| 3,219,215 | 11/1965 | Gunnlaugson | 414/739 |
| 3,311,350 | 3/1967 | Irwin | 414/23 |
| 3,529,735 | 9/1970 | Wehde . | |
| 3,823,916 | 7/1974 | Shaw | 414/23 |
| 3,974,925 | 8/1976 | McKenzie | 414/23 |
| 4,071,155 | 1/1978 | Hart et al. | 414/739 |
| 4,993,914 | 2/1991 | Riddle . | |
| 5,485,691 | 1/1996 | Stevens et al. | 37/302 |
| 5,516,250 | 5/1996 | Sawyer | 414/23 |
| 5,584,646 | 12/1996 | Lewis et al. . | |

*Primary Examiner*—Christopher P. Ellis
*Assistant Examiner*—Gregory A. Morse
*Attorney, Agent, or Firm*—Coudert Brothers

[57] ABSTRACT

The present invention comprises a tractor tool that attaches to and detaches from a tractor frame easily. In one embodiment, as few as four bolts and two actuator control couplings are used to mount the inventive tool to a tractor. The inventive tractor attachment tool is capable of grasping and lifting a heavy or awkward object, moving it to a new location, and setting it down without the tractor operator leaving the tractor controls. The object may be simply or oddly shaped, and it may be moved to a location that requires it to be lifted over a barrier like a wall. Small trees, bushes, piles of vegetative matter, or fence posts can be pulled from the ground and moved to a rubble or debris bin for hauling. The tool is comprised of a metal frame having two jaw members that open and close in a scissor-like fashion. The jaw members are opened and closed by jaw actuators, controlled by the tractor operator sitting on the tractor. Using the inventive attachment, a tractor operator can grab an item lying in a field, lift it, rotate it, and deposit it in a bin that is located, for example, behind a wall without the operator having to leave the tractor cab.

25 Claims, 6 Drawing Sheets

TRACTOR HYDRAULIC GRABBING TOOL

BACKGROUND OF THE INVENTION

1. Field of the Invention

This invention relates to tractor tool attachments for grasping and moving objects.

2. Description of Related Art

Currently, the most common way to lift heavy objects in the field requires the use of a rubber-tire tractor, front loader, a bucket with hooks welded to it, and a chain. The tractor operator manipulates the tractor arms to position the bucket over or under the object to be moved. Then a tractor foot pedal is set, the operator steps off the tractor, wraps the chain around the object, secures it to the hooks on the bucket, returns to the tractor and slowly and carefully lifts and then moves the object to the desired new location. One problem with this method is that the chain frequently slips and must be adjusted, a time-consuming task. The object may shift suddenly, striking the tractor. Another problem is that many objects cannot be secured with a chain at all. If the object is heavy, a bucket hook may give way resulting in a sudden drop in the load, which may damage the tractor or, worse, injure the operator. In addition, the operator must rely heavily on the tractor brake system for safety when securing the load. Once the object has been placed at the desired location, the operator must set the brake, get off the tractor, and unwrap the chain from the object and bucket hooks. This process is repeated for each object moved. It is a time-consuming, labor-intensive process. An alternative is to have ground personnel assist the tractor operator, but this is both an additional expense and the ground person could be injured if the chain or load suddenly shifted.

Some special devices have been made in an attempt to alleviate these problems. John Clatterbuck describes a "Front End Attachment for Tractors" in U.S. Pat. No. 3,140,786. Clatterbuck's attachment comprises a pair of jaw members that rely on a fork lift attachment. The jaw members are attached over the forks which guide the motion of jaws as they open and close. There are several disadvantages to Clatterbuck's tractor attachment. It is complex and cumbersome to install and remove from a tractor. Additionally, Clatterbuck's jaw design relies on forks which obstruct certain desirable operations. The forks are used to provide strength and to align the opening and closing movement of the jaws; these jaws will not operate unless they are attached to forks. Because Clatterback's jaws rely on the forks positioned in the most closed position the forks prevent many types of objects from being deposited on a surface below the jaws. For example a tree having a canopy wider than the fork spacing will not drop through the forks. The size of object that will freely drop through the forks, as one might desire if loading debris into a debris bin or truck, is limited to the space between the so forks. It should be noted in this regard that Clatterbuck teaches using the forks in the most closed position in order to provide mechanical support for his jaw members. Furthermore, the forks are positioned with only a narrow separation, and this restricts the ability to grasp and move bulkish, large, awkward objects. Additionally, the forks extend well beyond the jaw members. As a result, the forks interfere with a variety of desirable functions such as tilting the jaws toward the ground to grab an object near the ground or to use the tilted jaw to provide added leverage in pulling an item out the ground after grabbing it.

James W. Riddle describes a tractor attachment for removing fallen trees in his U.S. Pat. No. 4,993,914. Riddle's attachment is designed to attach to the back of a tractor. The tractor is backed up to a root system of an already uprooted tree and is then used to lift the roots a short distance off the ground, vertically, so that the tree which is lying on the ground can be dragged along behind the tractor. Riddle's attachment is not useful for uprooting trees or bushes. The Riddle attachment lacks utility for a number of other desirable tasks such as moving or removing fence posts from the ground, moving rocks, or lifting and moving any number of oddly shaped man-made items. Furthermore, the jaws of Riddle's tool cannot be tilted; they lift only in a vertical direction. As its title suggests, the Riddle implement performs only a single task. It is not a universal tool; it is a "Fallen Tree Removal Implement".

In U.S. Pat. No. 5,584,646, Billy M. Lewis, et al. disclose a complex "Handling Apparatus" that can be mounted to a turret positioned on top of a vehicle cab. Objects are gripped for moving from one place to another using gripping chains that are connected to chain tensioners. The Lewis, et al. structure is made for shop use and thus emphasizes a small footprint that may not be stable in the field. In addition, it is extremely complex and difficult to build and disassemble. It appears to be designed for use on a dedicated vehicle.

It would be very desirable to have a tractor tool that could be attached to and detached from the tractor easily with only a few fastening points and that was capable of a large number of varied grasping and moving tasks such as lifting heavy objects or uprooting trees or pulling posts out of the ground and repositioning the object in a easy, precise, and flexible manner.

SUMMARY OF THE INVENTION

It is an object of this invention to provide a tractor attachment tool capable of grabbing, lifting, pulling, picking up, holding, loading, rotating and moving objects without requiring a tractor operator to step off the tractor. The inventive tool is easy to attach to and detach from a tractor. Further, it can be attached to the front of the tractor for easy visibility to the operator.

The present invention comprises, a) a frame having at least one attachment section; b) a pair of jaw members, each member pivotally mounted on the frame, the jaw members moving in a scissor-like fashion at the front of the tractor; c) a jaw actuator assembly capable of opening and closing the jaw members in synchrony; and d) a control connection means to connect a tractor operator control to the jaw actuator assembly.

The inventive tool enables a tractor to be used to pick up logs, rocks, and large objects. By inserting the jaws between stationary elements of an item to be lifted, odd-shaped objects like a plow, a disc or other implements can be moved.

Using the tilting motion of conventional tractor arms, the present inventive tractor tool can be tilted downward to grab, for example, a shrub at or just below ground level at the top of its roots. The tractor can tilt the tool to provide torque, thereby enabling increased lifting force to be applied to the shrub. Tilting the tool additionally helps to pickup and move piles of vegetative matter such as poison oak, vines, and tree branches and limbs. The jaws can be positioned above the pile with jaws open and then move downward, compressing the pile against the earth before closing the jaws and lifting the pile.

DETAILED DESCRIPTION OF THE INVENTION

The present invention provides a tractor attachment tool capable of grasping and lifting a heavy object, moving it to a new location, and setting it down without the tractor operator leaving the tractor controls. The object may be simply or oddly shaped, and it may be moved to a location that requires it to be lifted over a barrier like a wall. Small trees, bushes, or fence posts can be pulled from the ground and moved to a rubble or debris bin for hauling. The inventive tractor tool comprises, a) a frame having at least one attachment section; b) a pair of jaw members, each member pivotally mounted on the frame, the jaw members moving in a scissor-like fashion at the front of the tractor; c) a jaw actuator assembly capable of opening and closing the jaw members in synchrony; and d) a control connection means to connect a tractor operator control to the jaw actuator assembly.

Figure 1:
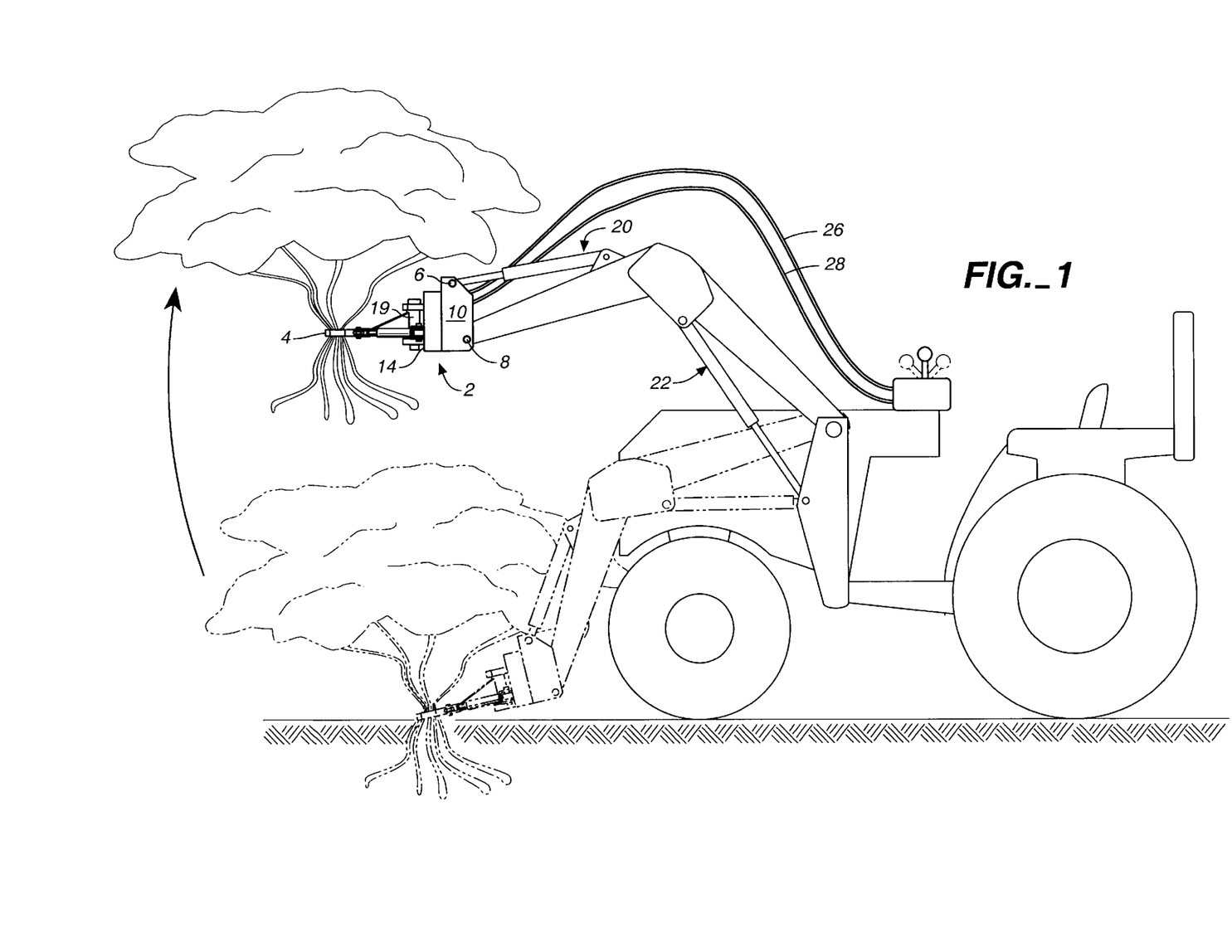
FIG. 1 is an overall perspective view of the inventive tool attached to a tractor.

FIG. 1 shows the inventive tractor tool 2 attached to a conventional rubber-tired tractor. Other vehicles can also be used, including track-type tractors. As seen in FIGS. 1–4, the unique configuration of the jaws 4, that are pivotally mounted on a frame 14 and connected to the frame only at the pivotal mount and via actuators, allows the inventive tool 2 to be tilted during it use. Using conventional tractor operation, the tool 2 can be tilted forward to grab, for example, a shrub, close to, at, or just beneath the ground surface. When this motion is reversed to raise or lift up the shrub, the tractor causes the jaws 4 to tilt back, thus providing torque to the item being lifted. In addition, tilting the tool 2 forward slightly when grasping the object allows the jaws 4 to be driven into the ground a little bit as the tractor is driven forward. This enables the jaws to be positioned as low as possible under a shrub, rock, or other object for removal. It also maximizes the lifting force when the tool 2 is used to uproot shrubs or small trees or to pull posts out of the ground.

The weight of the object that can be lifted depends on the nature of the tractor used, for example the rated lifting capacity, and the heft with which the inventive tool is manufactured. It can of course be manufactured from lighter or heavier materials depending on the strength characteristics required. The lifting force of a tractor may be rated at about 1,700 lbs and application of torque by tilting the tool, maximizes the lifting force applied to the object.

The tool 2 is easily attached to and detached from the tractor. In the embodiment shown in FIGS. 1–4, the frame 14 of tool 2 is attached to the tractor using an attachment plate 10 on each side of the frame (FIG. 3). In this embodiment, each attachment plate 10 has two apertures, 6 and 8, which are aligned to match bucket attachment apertures on the tractor arms. A total of four bolts, two on each attachment plate, are all that is needed to mechanically mount the inventive tool on the tractor. To mount the tool, the attachment plates are positioned next to the tractor arms so that apertures 6 and 8 align with the bucket-mounting apertures on the tractor arms. In other embodiments, the tool may be attached in a conventional fashion using a single attachment section, for example, via a post or rod connection in the middle of the frame. Tilt would, in that case, be controlled by at least one rotational element 22 provided on the tractor. There are a large number of conventional attachment mechanisms generally well known to practitioners in this art. All of them need not be described to understand the present invention. Additionally, control connections to the jaw actuators must be made when attaching the tool. In the preferred embodiment, two such control connections are used.

Figure 2:
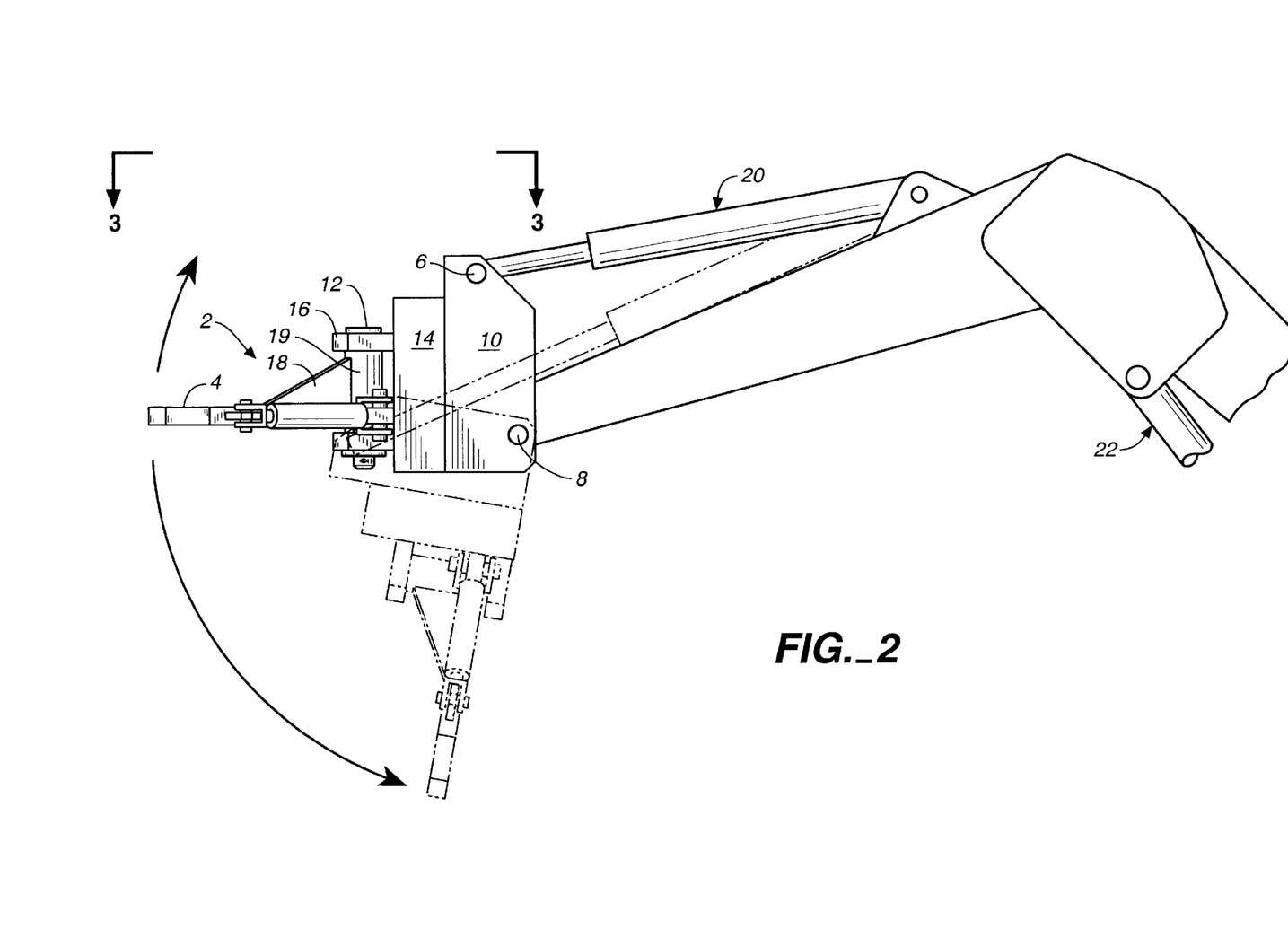
FIG. 2 shows an elevational side view of an embodiment of the inventive tool attached to the arms of a tractor.
Figure 4A:
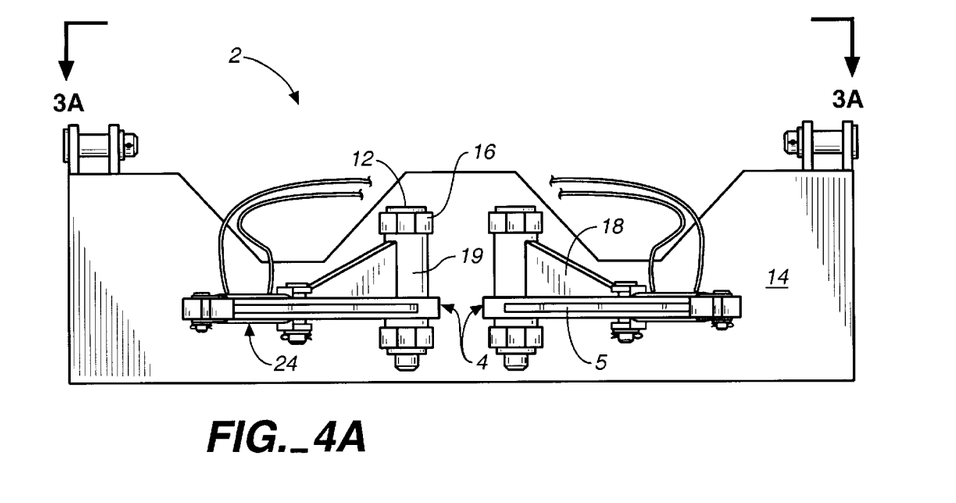
FIG. 4A shows a front elevational view of the inventive tool.

FIG. 2 shows an elevational side view of the inventive tool 2. Jaw members 4 are pivotally mounted on rods 12 (shown in FIG. 4) which in turn are attached to steel frame 14 by rigid mounts 16 welded to the frame. The frame is made from any of a number of materials strong enough to support the jaw action. Preferably the frame is made from metal. In the present embodiment, the frame was made from continuously so welded steel.

In the embodiment shown, a triangular piece of steel 18 is welded to each jaw member 4 and to a metal sleeve 19 that pivots with the jaw member about rod 12. This piece of steel mechanically strengthens the jaws.

The tool 2, mounted as shown in FIG. 2, is rotated or lifted by activating a rotational hydraulic assembly 20 and/or lifting hydraulic assembly 22, both of which are typically provided on conventional compound tractor arms.

Figure 3A:
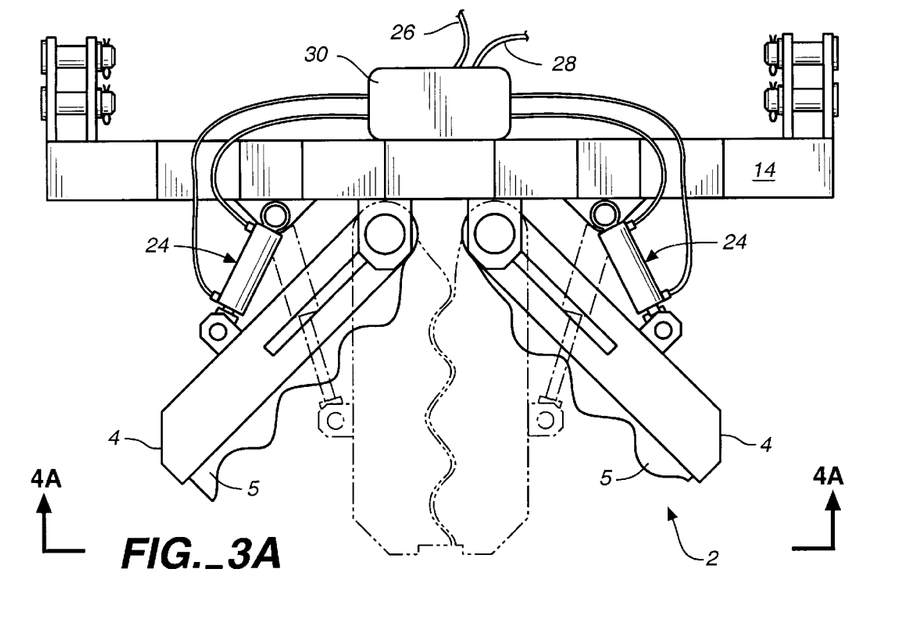
FIG. 3 shows a top plan view of the inventive tool having the jaws in an open position.

FIG. 3A shows a top plan view of the inventive tool wherein the jaws 4, comprising two members, are in the open position. Dotted lines show the jaw members in the closed position. Each jaw member has a grasping edge shaped to prevent the object from slipping. The grasping edge is preferably in the shape of a wave. The wave shape 5 of each jaw member corresponds to the wave on the other jaw member so the jaws 4 can be brought to a fully closed position as shown in FIG. 3. That is, the jaw members have a corresponding wave shape positioned to mate when the jaw members are closed against one another. The wave shape 5 extends along substantially the full length of each jaw member in the preferred embodiment, but may be shorter for some applications. The wave portion serves to prevent the lifted object from slipping. Other forms of irregular patterns can be used, such as teeth or sawtooth patterns. The wave form is preferred because it combines ease of manufacturing with grasping capability. It also has no jagged edges to catch on irregular shapes or to cause injury to workers. Other jaw member geometries that would be advantageous to use for specific grasping tasks include a planar or paddle shape. The paddles may be scored or formed into a wave to prevent the object from slipping. In another embodiment of the jaws 4, two or more parallel wave sections 5 can be mounted on each planar jaw member, so that 2, 3, 4 or more corresponding parallel wave sections come together each time the jaws are closed.

In the preferred embodiment, the two jaw members are synchronously opened and closed by using a pair of jaw actuators 24 that can be controlled from the tractor seat or cab. While a pair of actuators comprising hydraulic cylinder assemblies is shown in the drawings, other means could be used to open and close the jaws such as electric or gasoline motors, cables and pulleys, or other means generally known by practitioners in the machine arts. Means for synchronously activating the jaw members are varied and well known and described in mechanical engineering texts and manuals. For example, a single actuator having a coupling and pivot point could serve to close the jaws against a mechanical spring, which spring would restore the jaws to an open position when the single actuator was not on. Such assemblies are conventional and the universe of them need not be shown to understand the present invention.

Figure 3B:
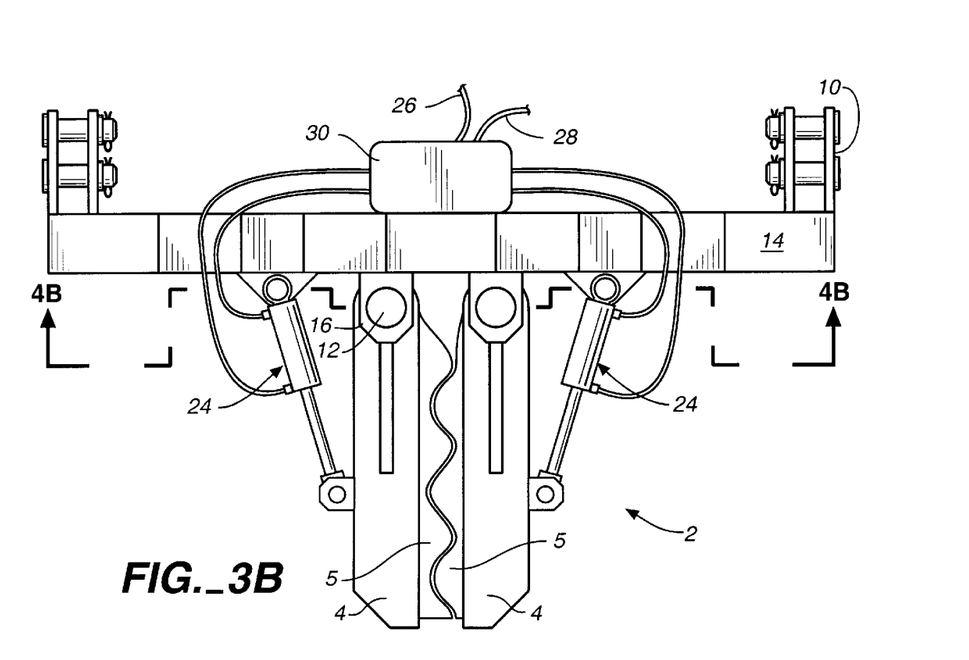

In the preferred embodiment, the jaw actuators 24 are hydraulic actuators comprising hydraulic cylinder assemblies. One actuator moves each jaw member with respect to the tool frame 14. Each actuator is thus connected at one end (a proximal end) to the frame and at the other end (a distal end) to a respective jaw member. A control valve, located on the tractor where the operator sits, pressures one of two control hoses 26 and 28 that attaches to a coupling on a manifold 30 which is in turn attached to the frame. In addition to mechanically mounting the inventive tool on the tractor, control hoses 26 and 28 must be coupled to the power take off hoses at the rear of the tractor before operation. In a different embodiment, a control hose could be coupled at the manifold. One of the control hose lines 26 or 28 routed through the manifold, powers both distal ends of the two hydraulic actuators, which controls opening the jaw members, and the other control hose line powers both proximate ends of the two hydraulic actuators, which controls closing the jaw members, thus achieving synchronous opening and closing of the jaws. For clarity, FIG. 3B shows the tool having the jaws only in the closed position.

Figure 4B:
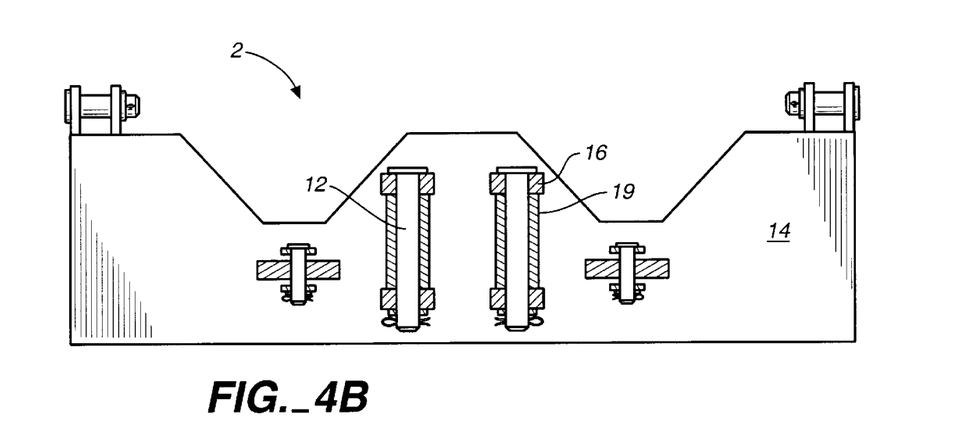
FIG. 4B shows a cross section through the jaw mounts.
Figure 5A:
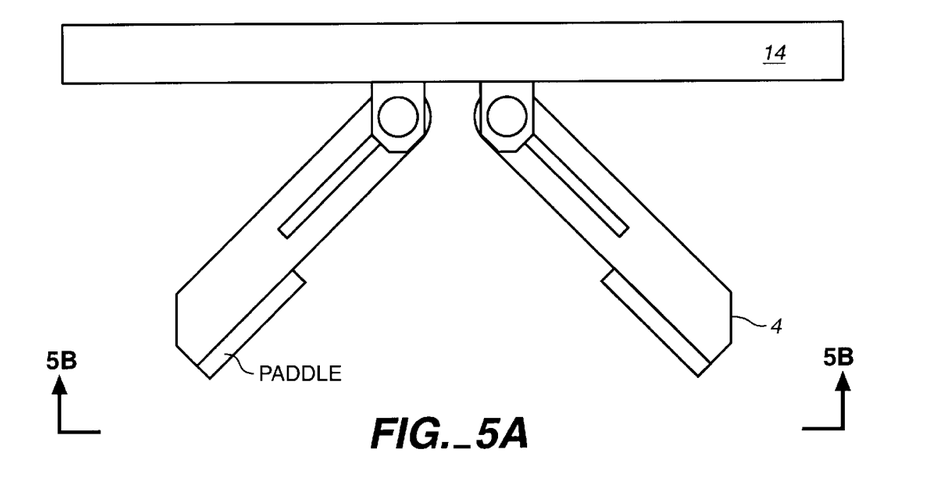
FIG. 5A shows a top plan view of the inventive tool wherein the jaw members have a two-dimensional paddle interface.
Figure 5B:
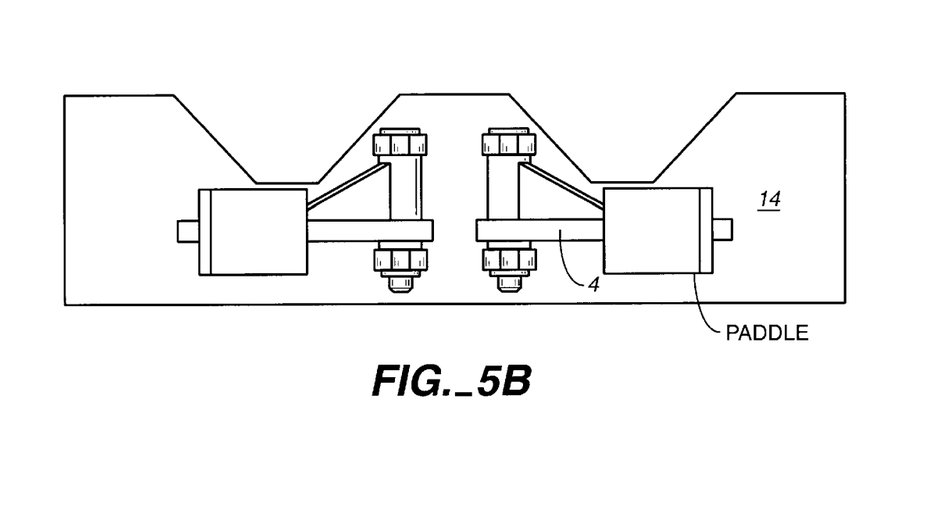
FIG. 5B shows a front elevational view of the inventive tool wherein the jaw members have a two-dimensional paddle interface.
Figure 6A:
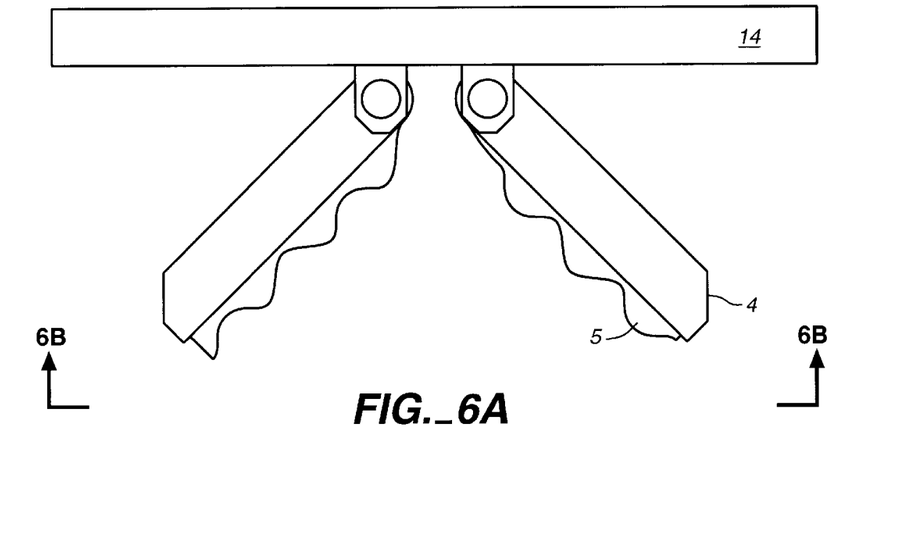
FIG. 6A shows a top plan view of the inventive tool wherein the jaw membes have three parallel corresponding wave blades.
Figure 6B:
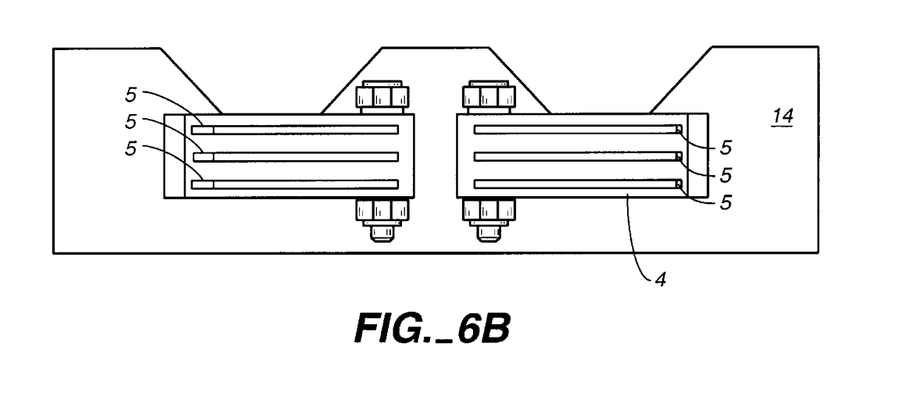
FIG. 6B shows a front elevational view of the inventive tool wherein the jaw members have three parallel corresponding wave blades.

FIG. 4A shows a front elevational view of the inventive tool. The jaw members 4 are preferably located as low as possible on the frame 14. To optimize mechanical strength, an optional triangular structural support 18 is preferably attached between each jaw and each pivotal mount, shown in this embodiment as a sleeve 19 over rod 12. FIG. 4B shows another view of the relation of sleeve 19, rod 12, and mount 16. The height of each rod 12 and support 18 is preferably as tall as the geometry of the frame will allow. The shape of the frame was chosen to minimize the length of hydraulic hoses, but the frame may have many other shapes. The embodiment shown in the figures uses a continuous piece of steel for the frame but depending on strength and other requirements the frame need not be fashioned from a continuous piece. Further, other materials besides steel can be used.

EXAMPLE 1

A Kubota tractor, fitted with the present inventive tool was used to clear rooted shrubs from a field. The tractor was driven up to a shrub, the jaws were placed in an open position, the tool was tilted slightly downward, and it was lowered until the jaws were positioned at the ground or slightly beneath it. The jaws were then closed around the shrub stalks near the roots and the tool was tilted upward from the ground and raised. The shrub and its root system was lifted from the ground and deposited in a bin with other debris without the operator ever leaving the tractor seat.

EXAMPLE 2

Trees were removed from a field using the inventive tool in a manner similar to that described above. The tree trunks were between about 6 inches and about 8 inches in diameter. The entire tree, including canopy, trunk, and root ball was uprooted, moved to a disposal area, and dropped there without the operator ever leaving the tractor.

EXAMPLE 3

A tractor fitted with the inventive tool is useful for lifting and loading hay bales; picking up and moving large pieces of trees or tree limbs; lifting and moving posts or logs; holding logs for cutting, for example into firewood; reaching behind a stationary wall to pick up and lift an item; lifting a vehicle for maintenance or repair work; moving pallets of material; loading debris boxes; loading items onto trucks; removing fence posts; moving and setting trees, rocks or other heavy objects for landscaping; lifting and moving equipment in a yard such as in a rental equipment yard; loading and unloading construction materials; and lifting and moving awkward items such as culverts, steel pipes, fence rolls, farm implements, or the like.

Thus, the present invention provides a novel universal grasper, lifter, and mover that can be attached to a tractor in an uncomplicated way and which has the strength and positioning capability to grasp heavy, irregularly shaped objects from the ground or other surface and move them to more desirable positions, and deposit them in the new location. In its preferred use, the tractor attachment is designed to move heavy and/or bulky objects, and to grasp shrubs, or small trees having trunks up to between about 6 inches and about 8 inches in diameter, or fence posts, and apply enough force to uproot them from the ground.

The description of illustrative embodiments and best modes of the present invention is not intended to limit the scope of the invention. Various modifications, alternative constructions and equivalents may be employed without departing from the true spirit and scope of the appended claims.

What is claimed is:

1. An apparatus for grasping one or more objects that attaches to a tractor comprising:

a) a frame having at least one attachment section for attaching the frame to the tractor;

b) a pair of jaw members, each member pivotally mounted on the frame, and having an inner clamping edge configured to prevent slipping of said grasped one or more objects with respect to said clamping edge, the jaw members movable in a common plane to a position where the inner edges are substantially adjacent;

c) a jaw actuator assembly capable of opening and closing the jaw members in synchrony; and d) a control connection means to connect a tractor operator control to the jaw actuator assembly.

2. The apparatus of claim 1 wherein the frame is metal.

3. The apparatus of claim 2 wherein the metal frame is a continuously welded structure.

4. The apparatus of claim 1 having attachment sections on each side of the frame.

5. The apparatus of claim 4 wherein each attachment section comprises attachment plates having apertures that align with apertures on a tractor arm such that a pin may be inserted therethrough to attach the frame to the tractor arm.

6. The apparatus of claim 1 wherein the pivotal mountings for the jaw members comprise parallel rods mounted on the frame.

7. The apparatus of claim 1 wherein each jaw member is mechanically stabilized with a reinforcing assembly attached to the jaw member.

8. The apparatus of claim 7 wherein the reinforcing assembly comprises a pivotally mounted steel piece welded to the jaw member.

9. The apparatus of claim 8 wherein the steel piece is triangular.

10. The apparatus of claim 1 wherein the jaw members have a corresponding wave shape.

11. The apparatus of claim 1 wherein the jaw members have a two-dimensional paddle interface.

12. The apparatus of claim 11 wherein the two-dimensional interface has two or more parallel corresponding wave blades.

13. The apparatus of claim 1 wherein the jaw actuator assembly comprises a pair of jaw actuators comprising a first actuator for selectivel applying an opening or closing force on a first jaw member and a second actuator for selectively applying an opening or closing force on a second jaw member, each actuator connected at one end to the frame and at second end to a respective one of the jaw members.

14. The apparatus of claim 13 wherein each actuator comprises a hydraulic cylinder assembly connected to one of the jaw members at a first, distal, end and to the frame on a second, proximate, end.

15. The apparatus of claim 14 wherein the control connection means comprises a hydraulic manifold attached to the frame, the manifold having on a first side connectors for coupling two control lines from a tractor operator control and having a plurality of connectors on a second side of the manifold for coupling the hydraulic lines to each hydraulic cylinder assembly.

16. An apparatus for grasping one or more objects that attaches to a tractor comprising:

a) a metal frame having attachment plates on each side, each attachment plate aligning with a tractor arm attachment section, such that a rotational controller on the tractor can tilt the frame towards the ground;

b) a pair of jaw members, each member pivotally mounted on the frame and having an inner clamping edge configured to prevent slipping of said grasped one or more objects with respect to said clamping edge, the jaw members extending in a direction that is normal to a frame surface and capable of movement relative to one another to a position where the inner edges are substantially adjacent;

c) a pair of hydraulic actuators, each comprising a hydraulic cylinder assembly, each cylinder having a proximate and a distal end relative to the frame and each actuator attached at a first end to the frame and at second end to one of the jaw members so that each jaw member is connected to one of the hydraulic actuators;

d) a first hose coupling attached to the frame, the coupling having on one side a connector for an external pressure source and having on its second side a hydraulic connection to the distal ends of both hydraulic cylinders; and e) a second hose coupling attached to the frame, the coupling having on one side a connector for an external pressure source and having on its second side a hydraulic connection to the proximate ends of both hydraulic cylinders.

17. A method for grabbing objects comprising:

a) attaching to a tractor a tool having hydraulically actuated jaws having an inner clamping edge configured to prevent slipping of said grasped one or more objects with respect to said clamping edge the jaw members movable in a common plane to a position where said inner edges are substantially adjacent, each jaw member pivotally mounted on a frame and connected to the frame only at said pivotal mount and via hydraulic actuators; and b) using the tractor to position the open jaw members around an object;

c) closing the jaw members around the object;

d) using the tractor to move the object to a new location; and e) opening the jaw members to deposit the object at the new location.

18. The method of claim 17 wherein the object is a plant that is being uprooted.

19. The method of claim 17 wherein the hydraulically actuated jaws are additionally connected to a structural reinforcing plate that is in turn connected to the pivotal mount.

20. The method of claim 17 further comprising, a) tilting the tool downward before closing the jaws; and b) using the tractor to apply torque to the object during the lifting step after closing the jaws.

21. The apparatus of claim 1 wherein each jaw member is pivotally mounted at a different location on the frame.

22. The apparatus of claim 1 wherein each jaw member has an inner edge and wherein said inner edges are aligned to mate as the jaws are closed.

23. The apparatus of claim 22 wherein the jaw members are configured to be selectively brought into a fully closed position.

24. The apparatus of claim 16 wherein each jaw member is pivotally mounted at a different location on the frame.

25. The method of claim 17 wherein the jaw members are positioned around the base of an object near or at the ground and the tractor is used to lift the tool and object.

* * * * *